(12) United States Patent
Ross et al.

(10) Patent No.: US 8,606,262 B1
(45) Date of Patent: Dec. 10, 2013

(54) TESTING OR RECORDING SYSTEM FOR A MOBILE TELEPHONE

(75) Inventors: Glenn E. Ross, Hammond, IN (US); David A. Rogala, Canton, NC (US); John A. Garlisch, Roselle, IL (US)

(73) Assignee: The Board Room, Inc., Romeoville, IL (US)

( * ) Notice: Subject to any disclaimer, the term of this patent is extended or adjusted under 35 U.S.C. 154(b) by 0 days.

(21) Appl. No.: 13/385,386

(22) Filed: Feb. 16, 2012

(51) Int. Cl.
*H04W 24/00* (2009.01)
*H04M 11/00* (2006.01)

(52) U.S. Cl.
USPC .................... 455/425; 455/67.11; 455/408

(58) Field of Classification Search
USPC .............. 455/406, 407, 408, 423, 424, 425, 455/67.11; 702/117, 118
See application file for complete search history.

(56) References Cited

U.S. PATENT DOCUMENTS

| | | | |
|---|---|---|---|
| 4,910,760 A * | 3/1990 | Reformato | 379/13 |
| 4,937,850 A | 6/1990 | Borbas et al. | |
| 5,456,605 A | 10/1995 | Borbas et al. | |
| 5,987,633 A * | 11/1999 | Newman et al. | 714/712 |
| 6,169,891 B1 * | 1/2001 | Gorham et al. | 455/408 |
| 6,272,337 B1 | 8/2001 | Mount et al. | |
| 6,421,793 B1 | 7/2002 | Lester et al. | |
| 6,434,223 B2 | 8/2002 | Katz | |
| 6,658,412 B1 | 12/2003 | Jenkins et al. | |
| 6,745,011 B1 * | 6/2004 | Hendrickson et al. | 455/67.11 |
| 7,123,907 B2 | 10/2006 | Sumcad et al. | |
| 7,187,932 B1 * | 3/2007 | Barchi | 455/445 |
| 7,222,078 B2 | 5/2007 | Abelow | |
| 7,339,891 B2 | 3/2008 | Binder et al. | |
| 7,512,584 B2 | 3/2009 | Keith, Jr. | |
| 7,747,249 B2 | 6/2010 | Guo et al. | |
| 7,778,801 B2 | 8/2010 | Smith et al. | |
| 7,974,988 B2 | 7/2011 | Nandiwada et al. | |
| 2002/0123339 A1 * | 9/2002 | Boehmke | 455/424 |
| 2006/0187868 A1 | 8/2006 | Pearce et al. | |
| 2006/0205397 A1 * | 9/2006 | So et al. | 455/423 |
| 2006/0205399 A1 | 9/2006 | Jain et al. | |
| 2006/0224545 A1 | 10/2006 | Keith, Jr. | |
| 2006/0247883 A1 | 11/2006 | Mok | |
| 2007/0061096 A1 | 3/2007 | Mok | |
| 2008/0057947 A1 * | 3/2008 | Marolia et al. | 455/425 |
| 2008/0102819 A1 * | 5/2008 | Bengtsson et al. | 455/425 |
| 2009/0111459 A1 * | 4/2009 | Topaltzas et al. | 455/423 |
| 2010/0227607 A1 | 9/2010 | Lorion et al. | |
| 2010/0309911 A1 | 12/2010 | Eshwar | |
| 2011/0092202 A1 | 4/2011 | Mattisson et al. | |

* cited by examiner

*Primary Examiner* — Christopher M Brandt
(74) *Attorney, Agent, or Firm* — Mathew R. P. Perrone, Jr.; Mark J. Hanson

(57) ABSTRACT

A test system for a communication device, such as a mobile telephone, uses flexible software, that runs on a variety of different hardware setups, so that the system generates events from the communication device either through batch processing or creation of a batch of test events interactively for that particular purpose.

6 Claims, 3 Drawing Sheets

TESTING OR RECORDING SYSTEM FOR A MOBILE TELEPHONE

This invention relates to a testing or recording system for a communication device, such as a mobile telephone, and more particularly to a batch of test events loadable on the communication device from a structured query language (SQL) to permit testing or recording of activity on the communication device.

BACKGROUND OF THE INVENTION

With a mobile communication system, which can be a cellular telephone system or another personal communication services system, cellular telephones or mobile telephones or another personal communication service system communicates through set ups. There is a radio base station and mobile switching center for those communication devices. The switching center connects the mobile telephone to another wireless telephone or to a wire telephone. If the wire telephone is desired, a public switch telephone network or PSTN is used.

Within the cellular telephone or personal communication system are a number of cells, each cell having a base station with transmitting receiving antennas. With mobile telephone in the cells, access can be granted by transferring predetermined messages to control channel to the mobile switching center. Access to the system is then given to the mobile telephone on an available voice channel. In addition, as a mobile telephone moves from one cell to another, the cell or the switching center transfers the mobile telephone from one cell to another.

Such a mobile switching center may be running under the control of the switching software. This software may store locations of mobile telephones that may move between cells and take care of the transfer between the cells. Various types of tests are required to determine whether the components are operating properly. Such tests can be performed using software simulations. To test actual operations in situations is sometimes required on one or more mobile telephones within a cell and between calls to test the access and hand off capabilities.

However, conventional test techniques require the physical moving are costly and difficult to handle. It is also difficult to move mobile units around a geographic area. Thus, it is necessary to improve the mobile testing system.

SUMMARY OF THE INVENTION

Among the many objectives of the present invention is the provision of a testing system for a mobile telephone.

Another objective of the present invention is the provision of a testing system for a mobile telephone, which functions as the mobile phone moves.

Yet another objective of the present invention is the provision of a testing system for a mobile telephone, which adjusts to the position of the mobile relative to at least one member of a set of cellular towers.

These and other objectives of the invention (which other objectives become clear by consideration of the specification, claims and drawings as a whole) are met by providing a test system for mobile telephone with flexible software that runs on a variety of different hardware systems, wherein the testing system generates events from a mobile phone either through batch processing or creation of a batch of test events interactively for that particular purpose.

BRIEF DESCRIPTION OF DRAWINGS

Throughout the figures of the drawings, where the same part appears in more than one figure of the drawings, the same number is applied thereto.

DESCRIPTION OF THE PREFERRED EMBODIMENTS

Figure 1:
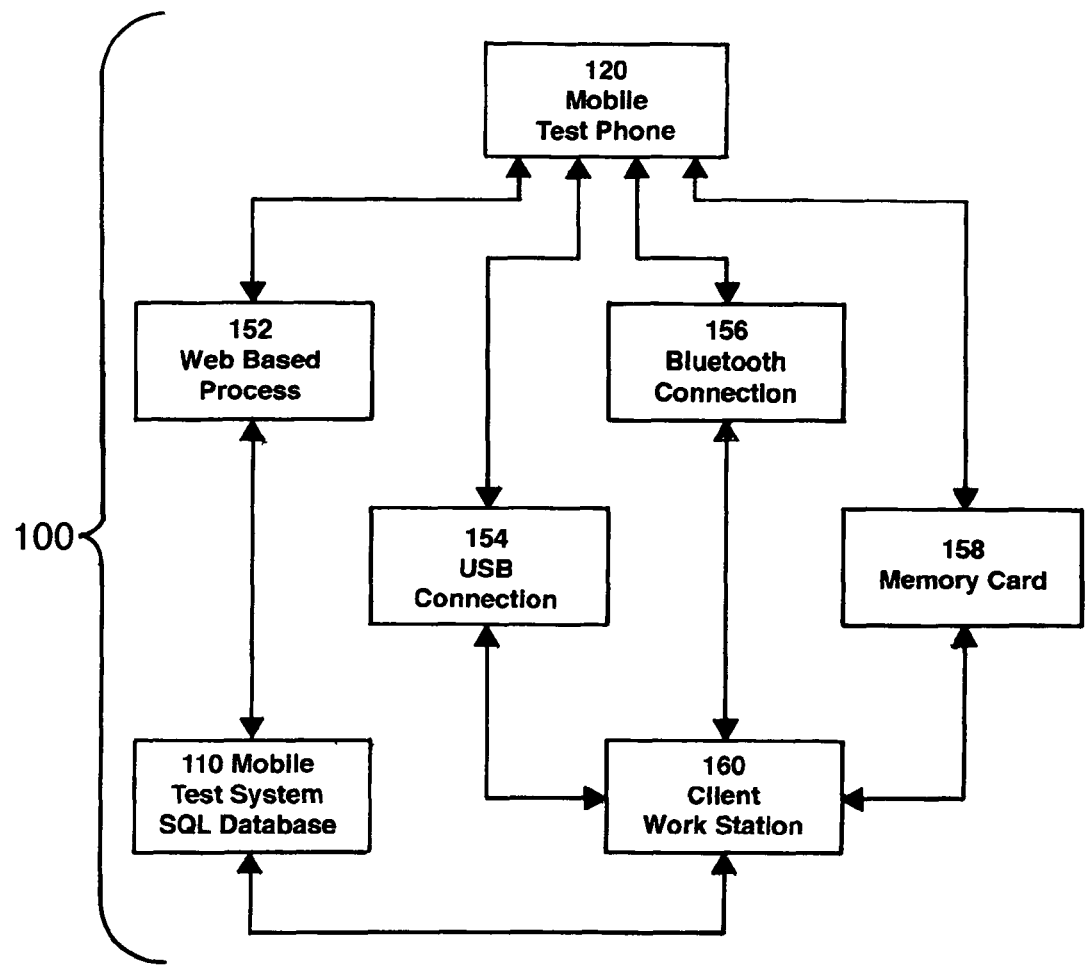
FIG. 1 depicts a block diagram of the mobile test system 100 of this invention.

Reference will now be made in detail to several embodiments of the invention that are illustrated in accompanying drawings. Whenever possible, the same or similar reference numerals are used in the drawings and the description to refer to the same or like parts or steps. The drawings are in simplified form and are not to precise scale. For purposes of convenience and clarity only, directional terms such as top, bottom, left, right, up, over, above, below, beneath, rear, and front, may be used with respect to the drawings. These and similar to directional terms are not to be construed to limit the scope of the invention in any manner. The words attach, connect, couple, and similar terms with their inflectional morphemes do not necessarily denote direct or intermediate connections, but may also include connections through mediate elements or devices.

The test system for mobile telephone consists of software that runs on a variety of hardware systems. For example, the hardware system, includes, but is not limited to, a Windows-based client personal computer (PC), a SQL compliant database, a web service and an application that runs on a modern mobile communications device. android phone. For example, a Windows-based client can be used with the PC. The SQL compliant database can be a Server database. The modern mobile communications device can, for example, be an android phone or similar device.

The system is used to generate events from a mobile phone either through batch processing or creation of at least one test event from a batch of test events interactively for a particular purpose. An event is anything that can be done by a normal user from a mobile phone such as placing a phone call, sending a text message, browsing the web, streaming video, or one of many other events possible from a modern mobile phone.

The user initiates tests through the user interface by choosing the types of events and the particular mobile phone. The batch of tests are loaded to the mobile phone either through a (USB) Universal Serial Bus connection or a Bluetooth connection. The tests may also be loaded from a memory card, or retrieved by the phone from a SQL database (through the web service).

Once the batch of tests is loaded to the phone, the phone proceeds to process each of the events and record the results. The results consist of the time and date, the result of the event, the (GPS) global positioning system coordinates, and any other information relevant to the event. Once the batch of events completes the mobile phone will connect with the SQL database and upload the results.

The user will then retrieve billing records from various sources and initiate a comparison between the actual results and the expected results as set up by the user. The PC hosts the user interface used to initiate tests, view the results, and maintain tables necessary for testing. The software on the PC side allows the user to create a series of events to be generated by the mobile phone.

This batch of events is then loaded on the mobile communications device through direct connection through USB, transmission through Bluetooth, transmission through wireless, or the mobile communications device downloading through the web service. The user will choose which events to include in a batch of events through the use of the user interface.

The system database contains tables which define the types of events that are possible. For example in the case of placing a phone call, the database contains tables that define the different types of phone calls possible. These calls may be local, toll, long-distance, toll free, directory assistance, operator assisted, and any other type of phone call that can be dialed by a consumer.

The software also consists of a user interface to maintain the data tables used and generated by the test system. In the mobile environment records used for billing various events come from a variety of sources. The mobile test system includes a wizard to map billing records from any source to an appropriate format. The wizard will allow the user to define the relationship between the imported records and the records in the system.

As new features are added to the phones and the new record sources are encountered, these new records definitions can be imported. The Web Service will act as an intermediary, handling all transactions between remote clients (that is, mobile communications device or client PC) and the SQL database.

All events that the phone is capable of performing are determined. For each event, as much information as possible about the event is recorded on the phone to be updated to the database when the phone communicates with the PC side. The mobile phone will record different aspects of each event depending on the event. In the case of a normal phone call the system will record the time and date, the result of the call, GPS coordinates, duration, number dialed, and other specific aspects of the call available on the phone.

A batch of test calls can be loaded on the phone through various methods. For example, the methods include, but are not limited to, a direct USB connection, a Bluetooth connection, from a proprietary web service, or a memory card. The batches of events created by the user are stored in the single database. Sending and retrieving batches of calls to or from the phone is triggered by entries in the database.

The system PC does not directly communicate with the mobile phone, but rather writes records to the SQL database that are then read by the mobile phone through one of the methods listed above. The SQL database consists of all tables necessary to create tests, to upload tests, and to store the results of tests.

Now considering FIG. 1, mobile test system 100 may use mobile test system SQL database 110 for the testing the mobile test phone 120. The testing may be done many ways; such as on a web based process 152, a USB connection 154 or a Bluetooth connection 156. The memory card 158 cooperates with the client work station 160.

Figure 2:
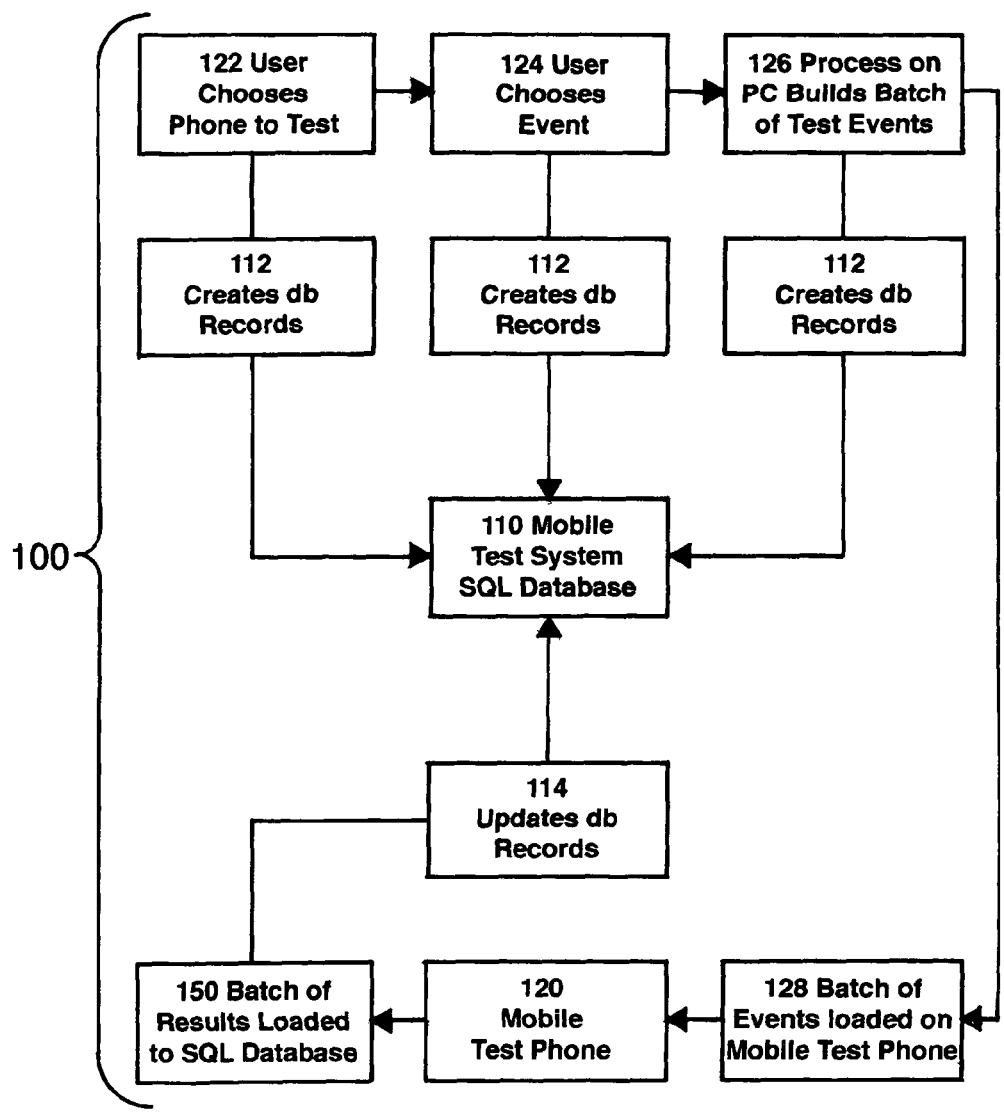
FIG. 2 depicts a block diagram of the user chosen test phone 122 for the mobile test system 100 of this invention.

Adding FIG. 2 to the consideration, data base records 112 are created whether the user chooses a phone on which to use test 122, the user chooses event 124 or a process on a computer, such as a personal computer, and builds batch of test events 126. In all cases, mobile test system SQL database 110 updates database records 114. The batch of events 128 is loaded on mobile test phone 120, which then permits a batch of results 150 to be loaded to SQL database 110 (FIG. 1).

Figure 3:
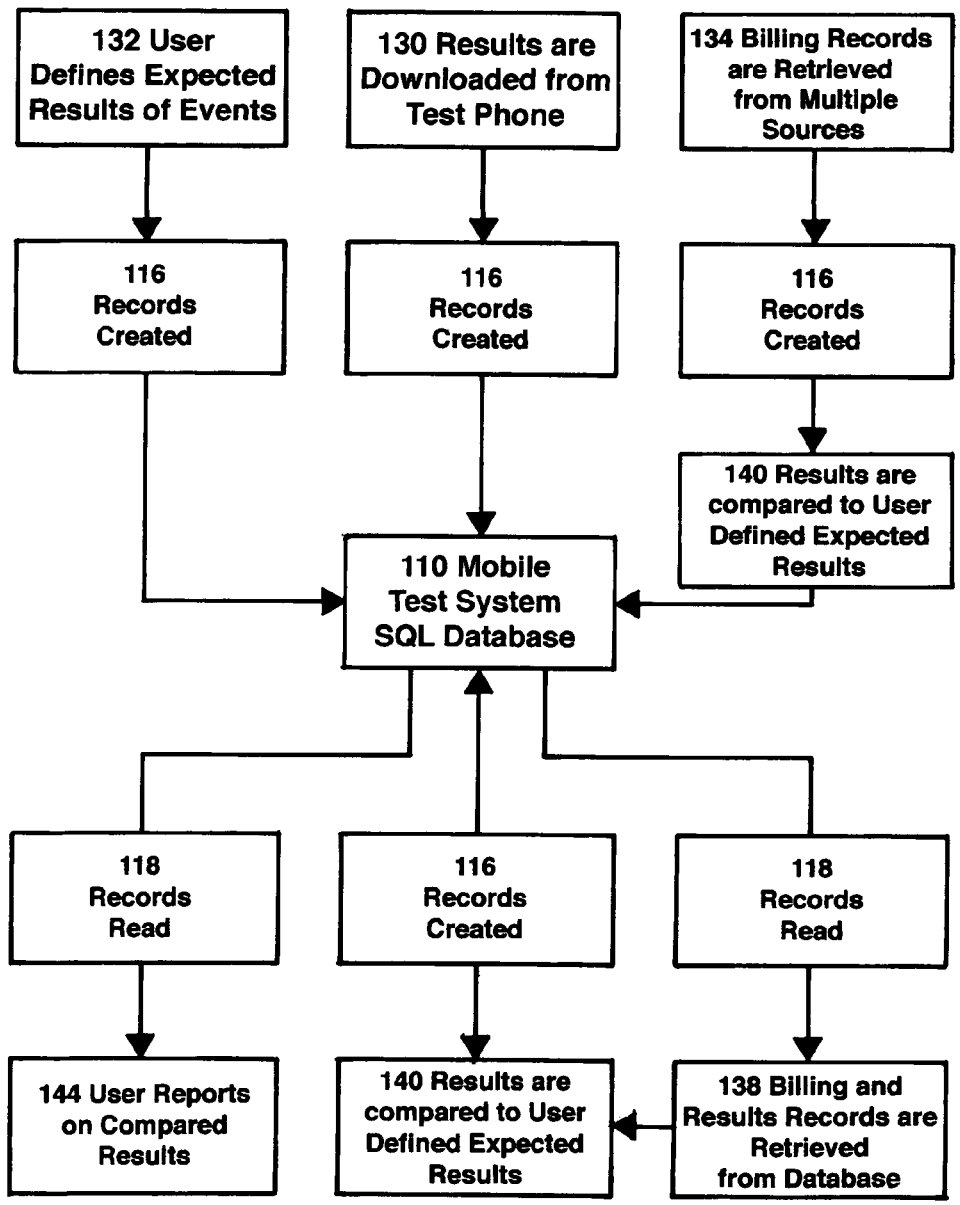
FIG. 3 depicts a block diagram of the user expected results 132 for the mobile test system 100 of this invention.

Adding FIG. 3 to the consideration results are downloaded from test phone 120. Whether the user defined results are downloaded from a test phone 130, are the expected results of events 132, or are billing records, or are retrieved from multiple sources 134; records created 116 provide information to mobile test system SQL database 110. Such information is, on one hand, passed to records read 118 and then to user reports on compared results 144.

Such information is, on the other hand, passed to records read 118 and then to billing and result records retrieved from database 138. From there results are compared to user defined expected results 140, which are then fed to records created 116, and back to mobile test system SQL database 110.

Such flexibility in mobile test system 100 provides great advantages. Not can the desired testing occur with minimal transportation problems, the desired results can retrieved, analyzed, adjusted, or otherwise utilized with great efficiency and effectiveness. Then any required adjustments are done more quickly or with greater efficiency.

This application—taken as a whole with the abstract, specification, claims, and drawings—provides sufficient information for a person having ordinary skill in the art to practice the invention disclosed and claimed herein. Any measures necessary to practice this invention are well within the skill of a person having ordinary skill in this art after that person has made a careful study of this disclosure.

Because of this disclosure and solely because of this disclosure, modification of this tool can become clear to a person having ordinary skill in this particular art. Such modifications are clearly covered by this disclosure.

What is claimed and sought to be protected by Letters Patent is:

1. A method for providing a testing or recording system for a mobile phone:
   a) providing a batch of test events loadable on the mobile phone from a structured query language;
   b) loading the batch of test events on the mobile phone;
   c) testing or recording of activity on the mobile phone;
   d) using a flexible software with the test system, wherein the flexible software runs on a variety of different hardware systems, and wherein the test system generates at least one test event from the mobile phone, either through batch processing or creation of the at least one test event interactively for a particular purpose;
   e) selecting the least one test event for the mobile phone;
   f) initiating the at least one test event on the mobile phone through a user interface by choosing the at least one test event;
   g) having the batch of tests loaded to a system;
   h) selecting the at least one test event possible with the mobile phone from at least one of the group consisting of placing a phone call, sending a text message, browsing the web, and streaming video;
   i) loading the at least one test to the mobile phone through a Universal Serial Bus connection, Bluetooth connection, a memory card, or a SQL database;
   j) processing each of the at least one event;
   k) recording at least one result produced by the at least one test;
   l) completing the recording;
   m) connecting the mobile phone with the SQL database;
   n) uploading the at least one result to the SQL database, the at least one result including at least one item selected from the group consisting of time and date, a result of the event, and global positioning system;
   o) a user then retrieving billing records from various sources; and p) comparing the results of the at least one test event and the retrieved billing records.

2. The method of claim 1 further comprising:
a) a comparison between actual test event results and expected test event results, as set up by the user;
b) a computer hosting the user interface used to initiate tests, view the results, and maintain tables necessary for testing;
c) a set of software on the computer side allowing the user to create a series of events to be generated by the mobile phone; and
d) the series of events being loaded on the mobile phone through direct connection, USB, transmission through Bluetooth, transmission through wireless, or a web service.

3. The method of claim 2 further comprising:
a) the user choosing which events to include in a batch of events through the use of the user interface;
b) the system database containing tables which define the types of possible events; and
c) the software consisting of a user interface to maintain the data tables used and generated by the test system.

4. The method of claim 3 further comprising:
a) placing a phone call to define the at least one event;
b) providing the database with tables that define the different types of phone calls possible;
c) providing software with a user interface to maintain the data tables used and generated by the test system;
d) obtaining records from a variety of sources;
e) providing a wizard to map billing records from any source to an appropriate format; and
f) allowing the user with the wizard to define the relationship between the imported records and the records in the system.

5. The method of claim 4 further comprising:
a) adding new features;
b) importing new records definitions;
c) having a Web Service act as an intermediary, handling all transactions between remote clients; and
d) acquiring the desired information.

6. The method of claim 5 further comprising:
a) the system recording the time and date, the result of the call, GPS coordinates, duration, and the number dialed;
b) loading test calls on the mobile phone through a direct USB connection, a Bluetooth connection, from a proprietary web service, or a memory card;
c) storing batches of events created by the user in the single database;
d) sending and retrieving batches of calls to or from the phone being triggered by entries in the database;
e) writing records from the mobile phone to the SQL database;
f) providing tables for the SQL database to create tests, to upload tests, and to store the results of tests; and
g) providing a hardware system selected from the group consisting of an application that runs on a modern mobile communications device; and
h) choosing the phone call local, toll, long-distance, toll free, directory assistance, collect or operator assisted phone calls.

* * * * *